United States Patent [19]

Gitman et al.

[11] Patent Number: 4,861,262

[45] Date of Patent: Aug. 29, 1989

[54] METHOD AND APPARATUS FOR WASTE DISPOSAL

[75] Inventors: Gregory M. Gitman, Duluth; Boris M. Khudenko, Atlanta, both of Ga.

[73] Assignee: American Combustion, Inc., Norcross, Ga.

[21] Appl. No.: 9,145

[22] Filed: Jan. 29, 1987

Related U.S. Application Data

[63] Continuation-in-part of Ser. No. 883,769, Jul. 9, 1986, Pat. No. 4,797,087, which is a continuation-in-part of Ser. No. 755,831, Jul. 15, 1985, Pat. No. 4,642,047, which is a continuation-in-part of Ser. No. 642,141, Aug. 17, 1984, Pat. No. 4,622,007.

[51] Int. Cl.⁴ .............................................. F23D 14/00
[52] U.S. Cl. ........................................ 431/5; 431/10; 431/12; 431/19; 431/75; 431/115; 110/188; 110/190; 110/211; 110/214; 110/246; 110/346
[58] Field of Search .............. 110/101 C, 101 CF, 204, 110/205, 210, 211, 214, 243, 244, 246, 186–188, 190, 346; 431/4, 5, 9, 10, 12, 19, 76, 79, 115, 116, 2, 75

[56] References Cited

U.S. PATENT DOCUMENTS

| | | | |
|---|---|---|---|
| 2,033,010 | 3/1936 | Russell | 431/4 |
| 2,110,209 | 3/1938 | Engels | 431/115 |
| 3,123,027 | 3/1964 | Livingston | 431/19 |
| 3,195,608 | 7/1965 | Voorheis et al. | 110/190 |
| 3,543,700 | 12/1970 | Baiges et al. | 110/187 |
| 3,716,001 | 2/1973 | Potasek et al. | 110/190 |
| 3,733,165 | 5/1973 | Nakagawa et al. | 431/10 |
| 3,905,312 | 9/1975 | Nichols | 110/8 R |
| 4,013,023 | 3/1977 | Lombana et al. | 110/8 A |
| 4,094,632 | 6/1978 | Reed et al. | 431/5 |
| 4,279,208 | 7/1981 | Guillaume et al. | 110/346 |
| 4,309,949 | 1/1982 | Rastogi | 110/188 |
| 4,320,709 | 3/1982 | Hladun | 110/235 |
| 4,360,336 | 11/1982 | Shepherd | 431/76 |
| 4,398,475 | 8/1983 | McKiel, Jr. | 110/346 |
| 4,462,318 | 7/1984 | Carbeau et al. | 110/238 |
| 4,474,121 | 10/1984 | Lewis | 431/76 |
| 4,515,089 | 5/1985 | Ehrlichmann | 110/214 |
| 4,520,741 | 6/1985 | Carbeau et al. | 110/344 |
| 4,547,150 | 10/1985 | Vereecke | 431/12 |

FOREIGN PATENT DOCUMENTS

| | | | |
|---|---|---|---|
| 2283397 | 3/1976 | France | 431/4 |
| 2435668 | 5/1980 | France | 431/115 |
| 120964 | 9/1979 | Japan | 110/346 |
| 35838 | 3/1980 | Japan | 110/346 |

Primary Examiner—Noah P. Kamen
Attorney, Agent, or Firm—Needle & Rosenberg

[57] ABSTRACT

The invention relates to an afterburner apparatus and an incineration system and methods of waste destruction in primary incineration combustion means and afterburner means which both preferably utilize at least two different oxidizing gases. By varying the ratio of said oxidizing gases, the amount of total oxygen and nitrogen delivered in either means can be dynamically adjusted in accordance with the process requirements. Varying the flows of at least two oxydizing gases and auxiliary fuel in both the primary incinerator and afterburner makes it possible to operate the system under fluctuating waste loading conditions, by controlling temperature, partial pressure of oxygen and heat available for the process as a function of said ratio.

90 Claims, 3 Drawing Sheets

METHOD AND APPARATUS FOR WASTE DISPOSAL

This application is a continuation-in-part of Ser. No. 883,769, filed July 9, 1986, which is a continuation-in-part of application Ser. No. 755,831, filed July 15, 1985, which is a continuation-in-part of application Ser. No. 642,141, filed Aug. 17, 1984, issued as U.S. Pat. No. 4,622,007; all of which are incorporated herein by reference.

BACKGROUND OF THE INVENTION

The present invention relates to hazardous waste disposal systems, and more particularly to an improved incineration system and method which results in the efficient destruction of liquid and solid wastes in an apparatus including a primary incineration combustion means, at least one afterburner and a flue gas treatment system.

A typical waste incineration system for the destruction and removal of hazardous wastes consists of a primary incineration combustion apparatus, an afterburner and a flue gas treatment system. Additionally, the incineration system may include:

- a solid and/or liquid waste feed system;
- a system for feeding an auxiliary fuel, usually in gaseous or liquid form;
- a system for feeding oxidizer, usually air and sometimes oxygen or an oxygen enriched air;
- a system for the evacuation of incombustible solid products of incineration, such as bottom ash;
- a system of heat recovery from the hot exhaust combustion flue gases with generation of preheated combustion air for waste incineration units, hot water, steam and/or electricity;
- a system for preparing, feeding, recycling and treating any water solutions produced for removal of gaseous and/or particulates in the flue gas treatment system;
- a stack for the discharge of treated flue gases to the atmosphere;
- a control system including flow, pressure and temperature transducers and controllers for controlling the flow of fuel and oxidizers, process temperatures and pressures at strategic locations in the system; and
- a flue gas sampling system.

The primary incineration combustion apparatus for solid and liquid wastes and sludges may be embodied as rotary kilns, multiple hearth furnaces, fluidized bed furnaces, grate furnaces and other combustion apparatus. Liquid and semiliquid pumpable wastes can also be combusted in cyclonic reactors as well as in various burners during the initial thermal destruction step of incineration process.

The rotary kiln is the preferable embodiment of the primary incineration process due to its versatility. It is arranged as a cylindrical refractory lined vessel rotating about a slightly inclined axis. The residence time in the kiln varies from a fraction of a second to several seconds for gaseous materials and from several minutes to several hours for solid materials. Solid wastes can be charged in a kiln either continuously as in the case of shredded material or as a batch charge as in the case of containerized materials such as drums or bundles. Special loading devices are used for charging solid wastes while pumpable liquid wastes and sludges are typically introduced directly into the kiln. The combustible fraction of wastes is partially pyrolysed and oxidized in the kiln. An auxiliary fuel such as combustible liquid waste, oil, natural gas or propane is commonly used for preheating the kiln lining, for providing supplemental heating while combusting low caloric value wastes, and for insuring the combustion stability.

Although the design of other primary incineration combustion units differs from that of a rotary kiln, they typically accomplish the same functions and contain many of the same functional elements as the rotary kilns and exhibit much the same disadvantages as those discussed below for the kilns.

Afterburners are typically cylindrical refractory lined vessels equipped with an auxiliary burner which is fed with a liquid and/or gaseous fuel and an oxidizer. Combustible liquid wastes can be used instead of, or in addition to, the auxiliary fuel. Afterburners are used to insure combustion of organic vapors, soot and other combustible components remaining after the primary incineration process. The afterburners provide a high temperature, highly oxidizing atmosphere with sufficient residence time and mixing of combustible vapors with oxygen to insure the required degree of organics destruction.

The most typical unit for treatment of flue gases leaving the afterburner is a wet scrubber wherein the combustion gases are washed by water or water solutions. Soot and halogens are largely absorbed and sulfur dioxide and nitrogen oxides are partially removed in the scrubber. Some polar organics and organics which are adsorbed in the soot are also partially removed. An alkali is often added to the scrubbing water to increase the efficiency of scrubbing of halogens and sulfur dioxide. Electrostatic precipitators or dust baghouses are often used for removal of the particulates from flue gases.

Heat recovery units are often installed between thermal destruction and flue gas treatment units. Heat of hot combustion flue gases may be used to preheat the combustion air for the primary incinerator and/or afterburner.

Solid and liquid wastes typically contain organic and inorganic combustible constituents. A fraction of organics may be highly toxic, mutanogenic and teratogenic. This fraction of organics is usually called principle organic hydrocarbons (POHC). Many POHCs are very stable and require oxidation at elevated temperatures for their destruction. When wastes are charged into a kiln, a rapid volatilization and partial pyrolysis of organics, including POHCs and water, if any, occurs. The volatilized components of organics require an adequate quantity of oxygen for their oxidation. Fuel and oxygen are also needed to supply heat for vaporization of water and organics and for raising the temperature to required levels.

The appropriate firing rate and combustion air feed rate are selected to provide adequate temperatures and excess oxygen level for the incineration system to achieve the required destruction efficiency of the POHCs for a given type and quantity of wastes. This temperature and excess oxygen level will be maintained by the control system. Other nonhazardous organics present as well as the fuel are usually essentially oxidized when POHCs are oxidized in the primary incineration combustion apparatus; however, new intermediate products may be formed during the combustion process. These products include carbon microparticles, carbon monoxide and an array of organic compounds. Many of these organic compounds are a higher molecular weight polycyclic or polyaromatic organics such as dioxins, benz(a) pyrene, dibenz(a,c)anthracene, picene, dibenz(a,h)anthracene, 7, 12-dimethyl(a)anthracene, benz(b)fluortane, 9,10-dimethylanthracene. These higher molecular weight organics are often called products of incomplete combustion (PICs). PICs are often as hazardous as POHCs. A fraction of PICs becomes absorbed on carbon microparticles. The combined PICs and carbon particles represent soot. Accordingly, soot is also a hazardous product. Carbon monoxide is also a toxic constituent and only a limited quantity of it may be permitted for discharge into the atmosphere. Therefore, the waste incineration steps must insure the thermal destruction of carbon monoxide, soot and PICs in the gaseous phase. Such destruction should be provided prior to the discharge of the combustion gases from the afterburner.

Both the feed rate and the properties of wastes which are fed into the combustion system may vary. Extreme variations in the feed rate occur during the so called batch charge when a substantial quantity of wastes is rammed or otherwise introduced into the apparatus in a short period of time. Gradual variations in the feed rate are also possible for continuously charged waste streams. The operational objective of an incineration system is to maximize the amount of waste passing through the system while minimizing the amounts of discharged flue gases, POHCs, and PICs. Generally, the maximum allowable concentrations of pollutants in the flue gases are specified in the operating permit which is based on the current environmental requirements and regulations.

In order to achieve this operational objective high temperatures, sufficient retention time and high turbulence should be provided in both the primary incineration combustion apparatus and the afterburner. Typically, the kiln temperature ranges from 750° C. (1400° F.) to above 1100° C. (2500° F.). The residence time for gases in both the kiln and the afterburner ranges from a fraction of a second to several seconds. Turbulence in either the kiln or the afterburner is not defined quantitatively, however. It is usually assumed that mixing is sufficient to heat adequately all elementary streams of gases and to provide a sufficient contact between organics and oxygen molecules in the furnace. In order to insure the sufficient contact between organics and oxygen, an excess of combustion air in the range of 5% to 200% of stoichiometric is commonly used.

Temperature, retention time, level of excess air and turbulence in the primary incineration combustion apparatus and afterburner effect the destruction efficiency which may be maintained during the operation of a conventional incineration system. An increase in any of these parameters will enhance the destruction efficiency. Attempts to improve destruction efficiency by increasing one or more of the above parameters, however, has not proven to be effective utilizing currently available incineration systems because of a corresponding drop in one of the parameters as one of the others is increased. For example, a higher level of excess oxygen provided by an increase in the air feed results in a lower temperature and lower retention time of gases in the furnace. An increase of the temperature by raising the amount of auxiliary fuel results in increase of combustion product volume which reduces retention time.

The incompatible nature of these parameters in existing incineration systems has limited the capability of existing incineration systems to dynamically intensify the incineration process to overcome transient process malfunctions leading to process failures. Typical transient malfunctions resulting in incineration process failure modes are described below using the kiln as an example for the primary incineration apparatus.

When wastes are charged in large batches or when loading rates of liquids and sludges are rapidly increased, the quantity of oxygen present in the kiln and the amount of oxygen being fed into the kiln during the rapid vaporization stage typically is not sufficient for complete combustion to occur, resulting in an overcharging failure. Only a fraction of combustible constituents of wastes, including POHC, is completely oxidized, forming $CO_2$ and $H_2O$. The remaining organics are partially pyrolyzed and oxidized, thus forming carbon microparticles, CO and PICs. Vaporized fractions of POHCs and of wastes together with carbon microparticles, CO and PICs formed are transferred in an increased amount into the afterburner, so that afterburner is also overloaded. Meeting the oxygen requirements during the overload period in the kiln by substantially increasing the level of continuous combustion air feed rate would result in a shortening of the retention time for volatilized and partially pyrolyzed products in the kiln and may degrade the flame stability. This problem is aggravated by the fact that the substantially excessive air feed brings along extra nitrogen which absorbs a portion of the heat generated in the kiln, thus reducing the heat available for the process and, correspondingly, the temperature level resulting in reduced destruction efficiency of organics.

When a portion of the waste charged into the kiln during a certain time period has lower caloric value than the expected design value, the kiln temperature can decline due to reduced heat release. This may lead to the formation of cold spots in the furnace when local temperatures decrease below the ignition point for some organics. The result is a low temperature failure mode with a substantial breakthrough of the original organics which cannot be destroyed at lower temperatures. A drastic increase in PIC formation may also occur due to quenching of pyrolytic products formed from the original wastes and fuel.

Other failure modes may occur as a result of poor atomization of liquid wastes and poor mixing of wastes with available oxidizers. Poor atomization of liquid wastes leads to increased size of droplets resulting in incomplete combustion while poor mixing may provide an opportunity for the volatilized wastes to short circuit the combustion process, avoiding adequate contact with an oxidizer. Both of these failure modes result in products of incomplete combustion being transferred to the afterburner.

Flameout failure modes predominantly occur at unfavorable aerodynamic conditions in the combustion zone. High velocities of gaseous products near the burner during low fire conditions, a deficiency of oxidizer, and excessive infiltration of cold ambient air in the combustion apparatus are typically events which cause flameout. Excessive increase in the ambient air moisture content and the high moisture of the wastes being charged may be other sources of low temperature or flameout failure.

Failure modes similar to those described above for the kiln may also occur in the afterburner. In addition, overcharging, low residence time, low temperature, poor mixing, the cold wall effect, flameout and poor atomization in the kiln will always result in an increased PICs loading rate on the afterburner, and subsequently, in a lower thermal destruction efficiency overall for existing incineration systems.

Conventional incineration systems are hindered in their ability to address failure modes because the kiln, the afterburner, if used, and the air pollution control system are designed to operate in steady state conditions ignoring the existence of transient process disturbances which result in failure modes. Existing incineration systems are also unable to anticipate transient operational changes of the several individual elements of the incineration system. For example, they are not capable of rapidly boosting temperatures and oxygen content in the afterburner to overcome failure modes in the primary combustion apparatus.

Several attempts have been made to improve thermal destruction efficiency by enriching combustion air in the primary incineration means with oxygen (see, for example, U.S. Pat. Nos. 4,520,746; 4,462,318 and 4,279,208). The advantage of oxygen use in incineration processes is based on the reduction in the volume of nitrogen introduced into the incineration process. This reduction in the volume of nitrogen decreases the amount of heat stored in the nitrogen molecules making additional heat available for waste destruction and for increasing the temperature in the kiln. In addition, the use of oxygen reduces the quantity of gases flowing through the kiln, thereby increasing the residence time and the efficiency of destruction of persistent organics.

The use of oxygen in the waste incineration processes helps to stabilize combustion and to eliminate the possibility of failures related to low temperature, insufficient residence time and the negative impacts of low caloric wastes. However, the steady flow of additional oxygen may be only marginally effective in cases of transient overcharging, poor atomization and poor mixing, which are the failure modes most prone to the breakthrough of POHCs and formation of PICs. Permanently maintaining an elevated oxygen feed rate can result in overheating of primary incineration combustion apparatus and in damage to the metal parts and refractories. Moreover, an increased oxygen feed results in added operational costs. Although the additional use of a permanent oxygen flow may improve the destruction efficiency of kilns and afterburners, it cannot solve the problems related to the transient changes such as those caused by batch charging, poor atomization and poor mixing. This also cannot help to optimize the destruction efficiency at a given capacity or to maximize the capacity of the facility at a given or required efficiency. Existing methods cannot reconcile the conflict among the desired factors of high temperature, retention time, turbulence, and oxygen level in furnaces.

There exists, therefore, a need for an incineration system and method which results in the efficient destruction of liquid and solid wastes.

Further, there exists a need for a system and method which solves the problems related to the transient changes such as those caused by batch charging, poor atomization and poor mixing.

Also, there exists a need for a system and method capable of identifying critical prefailure conditions of the process and providing optimum levels of fuel, oxygen and air to be fed into the system.

SUMMARY OF THE INVENTION

The present invention relates to a waste incineration system comprised of a primary incineration combustion means which preferably includes a kiln, an afterburner means, and a flue gas treatment means. Both the incineration means and the afterburner means may utilize at least two oxidizing gases having different oxygen concentrations, for example, oxygen and air or oxygen and oxygen enriched air. By varying the ratio of these oxidizers the amount of total oxygen and nitrogen delivered in either the primary incineration combustion means, the afterburner means, or both can be adjusted. In the course of this adjustment the required temperature, retention time, turbulence and oxygen supply level can all be provided simultaneously and without negative side effects.

Additional oxidizing agents can be optionally used. For example, water or steam may be introduced to reduce soot and $NO_x$ formation. Additionally, water can be used for the temperature control in either the primary incineration apparatus or in the afterburner. Ozonated oxygen or air may also be used as an initiator of chain reactions.

Dynamic variations in the rates of feed of these different oxidizing gases insures the optimization of the combustion process so that the quantity of oxygen and nitrogen and water supplied conforms with that required for complete combustion whenever fluctuations in the demand for oxygen for combustion of waste occurs. In particular, such fluctuations are related to charging of large batches or other transient events that may potentially reduce the efficiency of thermal waste destruction.

Improvements in incineration processes by the use of oxygen may be achieved with the use of traditional combustion apparatus such as oxy-fuel burners, oxygen enriched burners and oxygen lances. Further improvements can be accomplished by the separate introduction of two different oxidizing gases such as air and oxygen into the combustion tunnel of the burner, as previously described in U.S. Pat. No. 4,622,077 and U.S. Pat. [number currently corresponding to allowed application Ser. No. 755,831]. In accordance with these patents, the oxygen stream is introduced primarily as a high pressure, high velocity jet or jets directed through the hot core of the flame. The excess oxygen directed throughout the flame core has a substantially elevated temperature as compared with excess oxygen being introduced around flame pattern in a mixture with combustion air into a primary incineration combustion apparatus. Such hot oxygen has an increased ability to oxidize organics. Additionally, the axial introduction of a high velocity oxygen stream enveloped by fuel and/or fluid waste stream which in turn is enveloped by air or oxygen enriched air, insures a more effective mixing of combustible components of the fuel and/or of the waste stream inside the flame pattern, thus reducing $NO_x$ and PICs formations. The transport of oxidizer toward the fuel or liquid waste particles in the flame pattern is also intensified due to better conditions for mixing of oxygen with combustibles from both outside and inside the flame pattern.

Stable combustion under dynamically changing operational conditions may be provided by the use of a burner described in U.S. Pat. application No. 883,769. This burner design provides a high temperature oxidizing gas being delivered for incineration purposes through a controllable flame pattern capable of uniform heating of the primary incineration combustion means and the afterburner means. This increased controllability reduces the possibility of cold spot formation or local overheating of the incineration system. Additionally, the high flame velocity of this burner is used to improve mixing and to reduce short circuiting.

The present invention also includes a dynamic control system containing transducers for measuring process variables such as temperature, pressure and flows of fuel, fluid waste, oxidizing gases and hot combustion products in order to identify critical prefailure conditions of the process based on signals received from the transducers and on such signals received by the process controller. The system prescribes the new "emergency" levels of fuel, oxygen and air to be fed into the primary incineration combustion means and the afterburner means to bring the process back to the desired mode of operation and to prevent process failure. Fuel, oxygen and air are supplied to the primary incineration combustion means by a gas train system containing the necessary valves and actuators communicating with the computerized control system to control fuel, oxygen and air flows according with the prescription of the process controller.

The present invention also relates to a method of waste incineration including the steps of identifying transient prefailure events and responding to such events by properly raising the ratio between the "emergency" amounts of oxygen and nitrogen being delivered into the afterburner means. An increase in the oxygen/nitrogen ratio immediately increases the temperature of the gaseous atmosphere of the afterburner vessel due to reduction of the ballast nitrogen flow. Also, a reduction in the nitrogen feed into the process results in an increase of the residence time for waste destruction and, therefore, in an improved destruction efficiency of the afterburner.

A further step in response to prefailure modes may be a rapid decrease of the flow of fuel being introduced in primary incineration means, without creating a problem with flame stability, to slow down the rate of volatilization in the primary incineration combustion means, to increase the quantity of oxygen available for the oxidation of the wastes and to further increase the retention time, simultaneously.

When two oxidizing gases are also utilized in the primary combustion incineration means, similar "emergency" changes in flow rates of these oxidizing gases may be implemented. If during an "emergency" operation, the kiln or afterburner temperatures rise for a prolonged period of time to a level above that allowable for the refractories, water or steam injection may be used for cooling purposes.

Mixing in the gaseous atmosphere and heat transfer in the afterburner means may be improved by tangentially feeding flue gases exhausted from the primary incineration combustion means into a vortex chamber of the afterburner vessel, thus eliminating short circuiting. Introduction of a high velocity flame in the afterburner may be arranged to create a venturi effect to move the entering stream of combustion products into the combustion chamber with less of a pressure drop. Alternatively, the flue gases may be fed into the vortex chamber axially, while a burner is fired into this chamber tangentially so that the hot exhaust gases from the primary combustion means are enveloped by and mixed with the hot oxidizing gases discharged from the burner.

The present method and apparatus are also capable of minimizing unplanned shutdowns of the incineration system and inappropriate transient releases of the POHCs and PICs to the atmosphere during shutdowns and transient surge conditions such as those caused by batch charging or unexpected changes in the caloric value of the waste as well as by other system malfunctions.

Other advantages of the invention will in part be obvious and in part appear hereinafter.

DESCRIPTION OF THE PREFERRED EMBODIMENT

The preferred embodiment of the invention, comprising a primary incineration combustion means, an afterburner means and flue gas treatment system means, is now described with reference to the drawings in which like numbers indicate like parts throughout the views.

Apparatus

Figure 1:
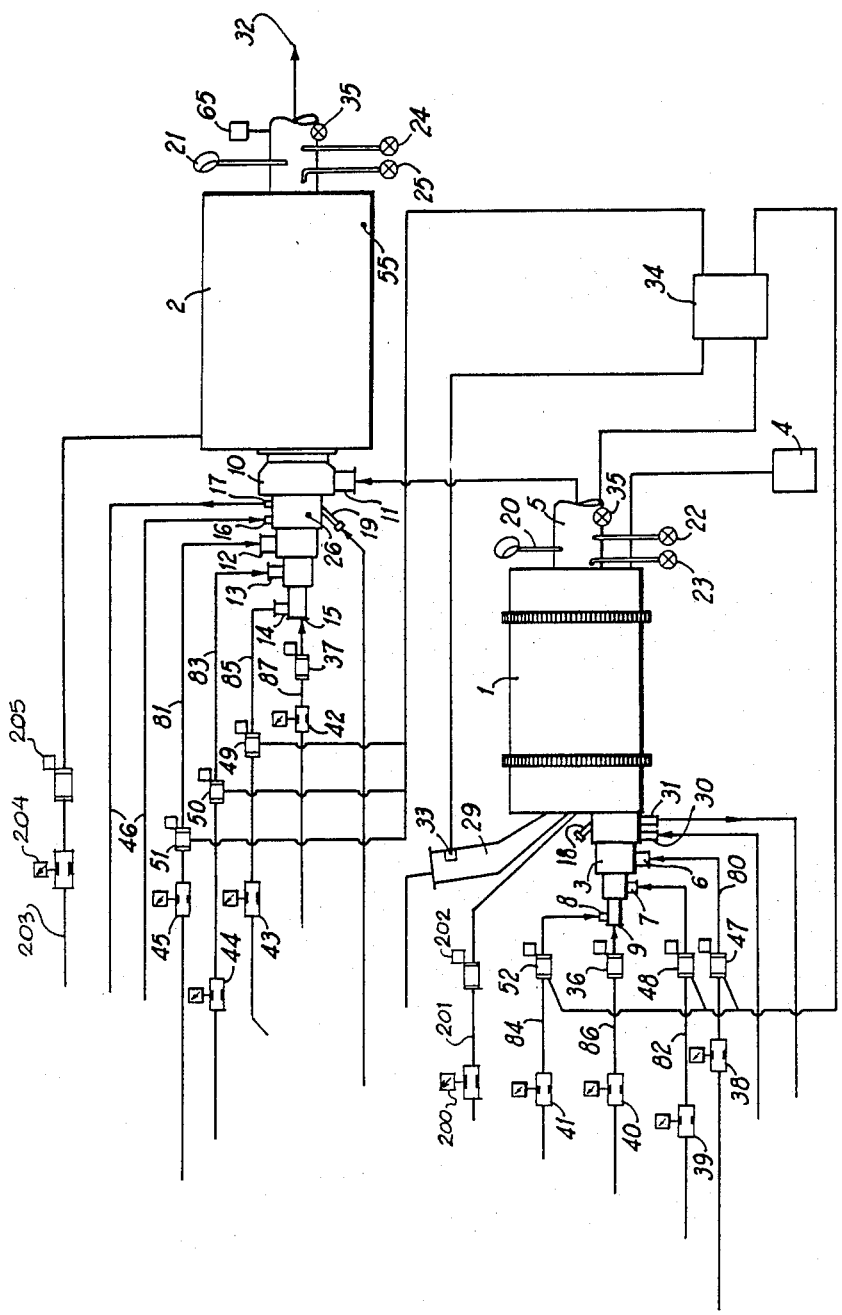
FIG. 1 is a process flow diagram of an incineration system.

FIG. 1 shows a flow diagram including a primary incineration combustion vessel, or kiln 1, which is a part of the primary incineration combustion means 70, and a means for providing containment for combustion and destruction 2 connected to the kiln by a connecting duct 5. A fluid waste burner 3 is attached to kiln 1, preferably a watercooled burner as described in detail in U.S. Pat. application Ser. No. 883,769. A means for feeding solid wastes 29 is attached to kiln 1. The burner 3 has a waste port 9 for the introduction of pumpable fluid wastes, a first gas port 6 for the introduction of a first oxidizing gas (for example, air), a second gas port 7 for the introduction of a second oxidizing gas having a different oxygen concentration from the first oxidizing gas (for example, oxygen), a fuel port 8 for the introduction of an auxiliary fuel, a water port 30 for the introduction of cooling water, and a cooling water discharge outlet 31. A collecting container 4 for ash residue is connected to kiln 1. A first flame supervising means 18 which determines the existence of a flame, such as an ultraviolet sensor, is built into the burner 3.

Figure 2:
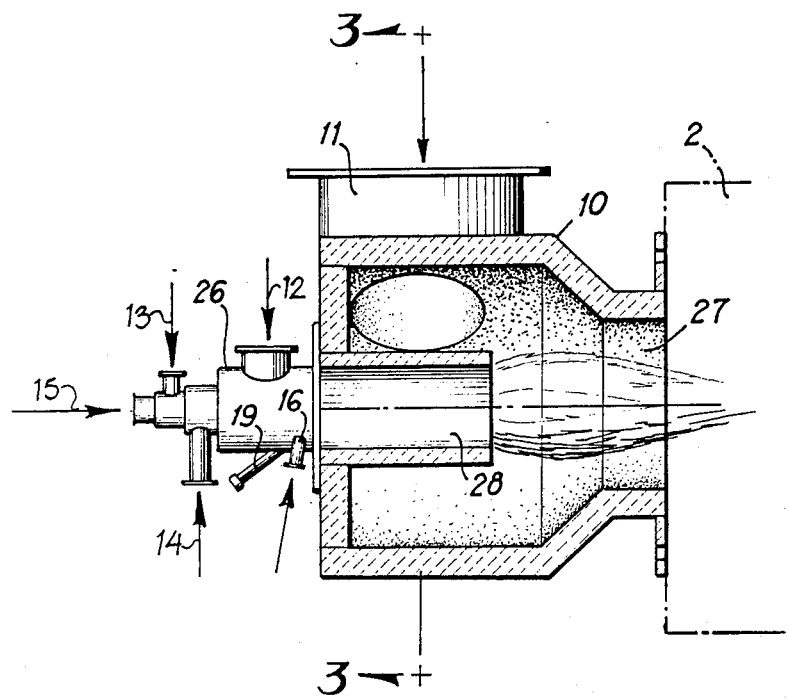
FIG. 2 is a longitudinal cross-sectional view of a burner mixer chamber used in the afterburner means.
Figure 3:
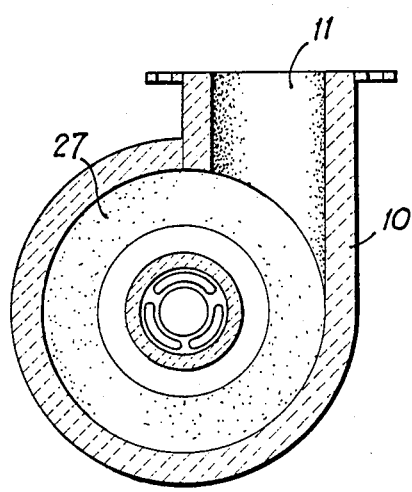
FIG. 3 is a side cross-sectional view of a vortex chamber taken along lines 3—3 in FIG. 2.

FIGS. 2 and 3 show a vortex mixing chamber 10 attached to the containment means 2 which receives hot flue gases from the kiln 1 by flue gas inlet 11. A first oxidizing gas, for example oxygen, is supplied through a first oxidizing gas inlet 13 to the fluid waste burner 26, and then into vortex mixing chamber 10. A second oxidizing gas having a different oxygen concentration from the first oxidizing gas, for example air, is supplied to the burner 26 through a second oxidizing gas inlet 12. Auxiliary fuel is supplied through an auxiliary fuel inlet 14. Pumpable fluid waste may be supplied in some cases through a liquid waste inlet 15. Cooling water for the liquid waste burner 26 is supplied through a cooling water inlet 16 and evacuated through a cooling water discharge outlet 17. A second flame supervising means 19 is used to identify the existence of the flame. The burner 26 is preferably designed as described in U.S. Pat. application No. 883,769 to maintain a hot stable flame core during continuous incineration operation, to prevent flame failure and to minimize $NO_x$ formation.

Figure 4:
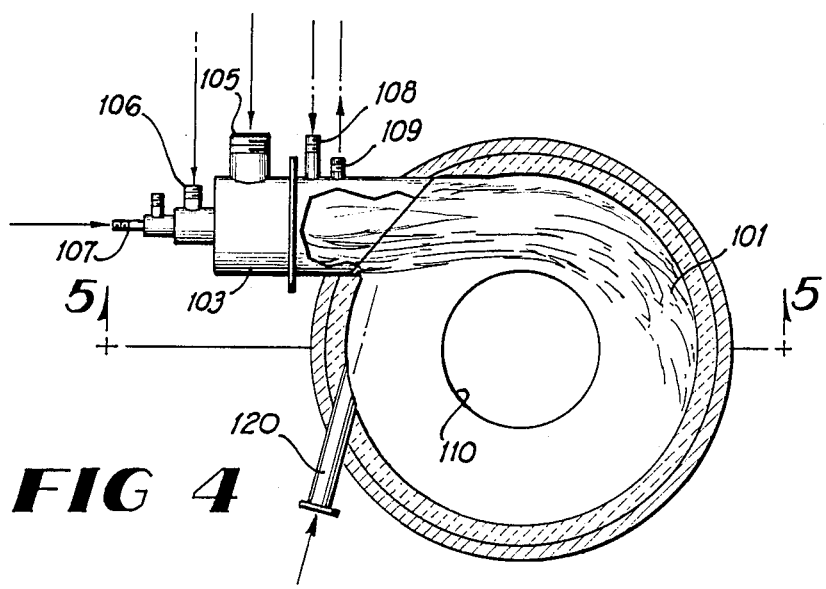
FIG. 4 is a longitudinal cross-sectional view of an alternative burner mixer chamber used in the afterburner means.
Figure 5:
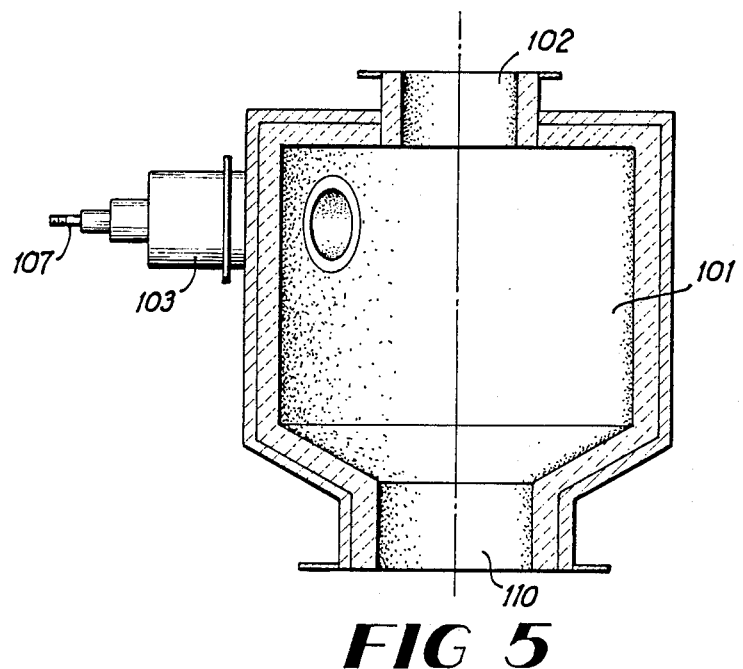
FIG. 5 is a side cross-sectional view of a vortex chamber taken along line 5—5 in FIG. 4.

FIGS. 4 and 5 show an alternative afterburner means which includes a vortex mixing chamber 101 with inlet 102 for flue gases fed from the primary combustion means 1 and a burner 103 which is similar in design to burner 26. Burner 103 is equipped with lines 104 and 105 for feeding primary and secondary oxidizing gases such as oxygen, oxygen enriched air or air, 106 for an auxiliary gaseous fuel and 107 for an auxiliary liquid fuel, and 108 and 109 for cooling water.

Referring again to FIG. 1, temperatures of combustion products exhausting from the kiln 1 are registered by a first thermocouple 20. Temperatures in the afterburner vessel 55 of containment means 2 are registered by a second thermocouple 21. The absolute pressure and the effluent flue gas flow rate from the kiln 1 are determined by first and second transducer 22 and 23, respectively, and the absolute pressure and the effluent flue gas flow rate from containment means 2 are monitored by third and fourth transducers 24 and 25, respectively.

A control system for detecting and adjusting to operational conditions in the apparatus is provided. The system includes a feed indicating means 33 for indication to a control means 34 of a batch charge approaching the feeding means 29. The feed indicating means 33 may be arranged, for example, as a limit switch which is energized when the batch charge passes its location. The control means 34 communicates with the feed indicating means 33. The control means 34 receives signals from thermocouples 20 and 21, electrical flow transducers 23 and 25, and pressure transducers 22 and 24. An optional smoke detection means 35 may be used to detect smoke in combustion products entering the flue duct 5. Such detection means 35 may include an ultraviolet flame detector or an electrical opacity sensor communicating with the control means 34. The control means 34 is also connected to operate a first air flow modulating means 47 on the first air line 80, a second air flow modulating means 51 on the second air line 81, a first oxygen flow modulating means 48 on the first oxygen line 82, a second oxygen flow modulating means 50 on the second oxygen line 83, a first auxiliary fuel flow modulating means 52 on the first auxiliary fuel line 84, a second fuel flow modulating means 49 on the second auxiliary fuel line 85, a first waste flow modulating means 36 on the first pumpable fluid waste line 86, and a second waste flow modulating means 37 on the second pumpable liquid waste line 87. The instant input flows to burner 3 are sensed for feedback control of the inputs by control means 34 as follows: air is measured by the first air flow metering means 38; oxygen is measured by the first oxygen flow metering means 39; auxiliary fuel is measured by the first auxiliary fuel flow metering means 41; and, pumpable wastes are measured by the first waste flow metering means 40. Similarly, for the second burner means 26, instant flow of air is measured by the second air flow metering means 45; oxygen is measured by the second oxygen flow metering means 44; auxiliary fuel is measured by the second auxiliary fuel flow metering means 43; and, pumpable wastes are measured by the second waste flow metering means 42.

The burner means 26 is fired into the interior of the vortex mixing chamber 10, shown in FIGS. 2 and 3, which is filled with hot flue gases being delivered from the kiln 1. The flue gases preferably enter tangentially to the interior 27 of the vortex mixing chamber 10, shown in FIGS. 2 and 3, thereby causing a rotating mixing movement. The flame of the fluid waste burner means 26, along with a controlled amount of excess oxygen, is directed through the burner combustion chamber 28 at high velocity, thereby creating a venturi effect for inspirating the kiln flue gases into the flame directed toward the afterburner vessel 55. This creates intensive mixing of the gaseous stream prior to entering a refractory lined afterburner vessel 55 of the containment means 2.

Referring now to FIGS. 1, 4 and 5, there is shown an alternative embodiment of the afterburner. This afterburner consists of a vortex mixing chamber 101 with inlet 102 for the flue gas transferred from the primary incineration means 1 and outlet 110 for transferring the hot gases in the afterburner vessel 55. The burner means 103 is tangentially attached to the vortex chamber 101. The burner means 26 has inlets 107, 104, 106 and 105 for feeding a combustible fluid (waste or fuel), a first oxidizer such as oxygen, an auxiliary fuel (when needed) and a second oxidizer, such as air, respectively.

Means for feeding additional amounts of oxygen 120 may also be provided. This means 120 allows oxygen to be fed directly into the vortex mixing chamber 101, if desired, rather than through input port 104. The vortex chamber 101 is attached to the afterburner vessel 55 by outlet 110 and is connected to the flue gas duct 5 by inlet 102. Alternatively, means 120 may be attached to the contracted section of the outlet 110. Additionally, a secondary burner similar to burner means 120 may be installed downstream of means 26. A further modification of afterburner shown in FIGS. 4 and 5 may include two or more consecutive rapid mix chambers similar to vortex chamber 101, having preferably burner means similar to means 103. These rapid mix chambers are communicating with each other by apertures allowing the flow of gases from the first rapid mix chamber into the second and following rapid mix chambers. Optionally, water or steam feeding means may be provided in either first, or second or all rapid mix chambers. Said rapid mix chambers may include afterburner vessels communicating with each mixing chamber to provide additional retention time.

Operation

Referring now to all of the figures, the operation of the system will be described. Solid waste may be continuously or batch charged into kiln 1 through feeder 29. At the same time pumpable fluid waste may be introduced for incineration through the waste port 9 into the fluid waste burner 3 and further with a flame into the kiln 1 interior.

For lower caloric value waste streams, auxiliary fuel may be introduced through auxiliary fuel port 8 into the burner 3 and further directed through the burner combustion chamber 28 towards the kiln 1 interior. A first oxidizing gas with low oxygen concentration (for example, air) enters the burner through first gas port 6 and is further directed through the burner combustion chamber 28 toward the kiln 1 interior. A second oxidizing gas with higher oxygen concentration (for example, oxygen) may be supplied from a liquid oxygen tank or from an on-site oxygen generation unit through second gas port 7 to fluid waste burner 3 and further through burner combustion chamber 28 toward kiln 1 interior.

To satisfy the required temperature in kiln 1 measured by thermocouple 20, the waste feeding rate, the auxiliary fuel flow and the first and second oxidizing gas flows to burner 3 and kiln 1 are maintained essentially constant during steady state operation. The kiln 1 temperature has to exceed sufficiently the temperature of volatilization of all organic components of the waste to a gaseous state during the solids retention time in the kiln 1. Additionally, the temperature should be above the ignition point of volatilized components originating from solid waste as well as combustible components formed during pyrolysis of pumpable waste and auxiliary fuel so that said volatilized combustion components undergo thermal destruction.

At the same time, the total amount of oxygen being delivered with oxidizing gases into the kiln 1 has to be kept high enough to insure its availability to completely combust auxiliary fuel and fluid waste, and to provide extra oxygen flow to destroy the bulk of combustible components being formed in the interior of the kiln 1.

Flue gases exhausted from the kiln 1 are directed into the first vortex mixing chamber 10 through flue gas inlet 11 and further throughout the interior 27 of the vortex mixing chamber 10 toward the interior of the afterburner vessel 55. At the same time, pumpable fluid wastes may be incinerated by introduction through liquid waste inlet 15 into combustion chamber 28 of the fluid waste burner 26 and further through the interior 27 of the vortex mixing chamber 10 toward the refractory lined vessel 55 of the containment means 2. Auxiliary fuel may be introduced when needed to insure flame stability and/or additional heat input to maintain the required afterburner temperature (for instance, as required by regulations), through auxiliary fuel inlet 14 into burner 26 then throughout burner combustion chamber 28 and further through the interior 27 of the mixing chamber 10 toward afterburner vessel 55. The first oxidizing gas with a higher oxygen content (for example, oxygen) than second oxidizing gas is directed into the burner 26 through the first oxidizing gas inlet 13, and further throughout combustion chamber 28, thus discharging hot oxidizing agent originated as auxiliary combustion products from the flame envelope of burner means 26 toward the interior 27 of vortex mixing chamber 10 and further toward afterburner vessel 55. A second oxidizing gas with low oxygen content (for example, air or oxygen enriched air) is directed into burner 26 through the second oxidizing gas inlet 12 and further throughout combustion chamber 28 thus discharging said hot oxidizing gas agent toward the interior 27 of the mixing chamber 10 and further toward afterburner vessel 55. At least 2% to 3% of residual oxygen content in the combustion gases leaving afterburner preferrably should be provided during steady-state operating conditions.

Referring now to FIGS. 4 and 5, an alternative embodiment of the vortex chamber will be operated as follows: The flue gases from the primary combustion means will be fed axially into the vortex mixing chamber 101 through inlet 102. The burner means 103 will be fed with a combustible fluid (waste or fuel), a first oxidizer such as oxygen, and a second oxidizer, such as air, or oxygen enriched air, through ports 107, 104 and 105, respectively. Auxiliary fuel may also be fed through port 106 when needed. The burner means 103 fires tangentially into mixing chamber 101 so that the hot auxiliary combustion product which may be, depending on operational mode, a hot oxidizing or reducing agent, originating as hot auxiliary combustion product from the flame envelope of burner means 103 mix with the flue gases fed from the primary combustion means 1 in the vortex chamber. Several operational modes of afterburner may be used. The selection of the operation mode depends on the composition of flue gases fed in the afterburner and environmental regulations.

When substantial quantities of POHCs, PICs, soot and CO are expected in the flue gases fed in the afterburner and $NO_x$ is of no concern, the burner means 26 is fired to produce a hot oxidizing auxiliary combustion product. Under this operational conditions, heat and oxygen are added to the flue gases in the afterburner, thus providing the required destruction of POHCs, PIC, soot and CO. In order to reduce $NO_x$ formation in the burner means 26, a fraction of oxidizing gas can be fed downstream of the hot flame zone at the burner means 26 by the use of the oxidizer injecting means 120.

When in addition to POHCs, PICs, soot and CO the concentration of $NO_x$ must also be controlled, the operation of the afterburner may be further improved as follows. The burner means 26 will be fired using fuel rich conditions to produce hot reducing auxiliary combustion products rich with CO and $H_2$. Since CO and $H_2$ are selective reducing species for $NO_x$, $NO_x$ will be reduced while oxygen in the flue gases will be consumed to a lesser extent. Simultaneously POHCs and PICs will undergo a further thermal destruction due to the additional heat provided with the hot reducing auxiliary combustion products generated in the burning means 26. By feeding additional oxidizing gas through the injecting means 120 downstream of the flame zone of the burner means 26, additional oxidative destruction of POHCs, PICs, soot and CO will be achieved to satisfy environmental regulations. A further improvement of this operating mode may be accomplished by the injection of a hot oxidizing auxiliary combustion product by the use of burner means similar to means 26 instead of or together with injecting a plain oxidizer by means 120. In this improvement additional heat is provided simultaneously with oxygen. A further improvement of this operating mode may include injection of water or steam into the burner means 26 thus increasing the CO and $H_2$ content in the hot reducing auxiliary combustion products.

When multiple consecutive rapid mix chambers are used, the chambers at the head of the afterburner can be fed with hot reducing auxiliary combustion products while the final stages will be fed with hot oxidizing auxiliary combustion product thus insuring $NO_x$ reduction and POHCs, PICs, soot and CO destruction.

Said hot auxiliary oxidizing combustion products have high temperatures and high momentum and provide high turbulence, extra heat to raise mix temperature and excess oxygen. As a result, rapid and uniform mixing occurs in chamber 101 and a final hot combustion product with at least 2% to 3% of residual oxygen is transferred through outlet 110 into afterburner vessel 55, wherein the required retention time is provided Such operation of afterburner insures accelerated burning of residual POHCs, CO, soot and gaseous PICs and provides higher destruction efficiency than that achievable with air above.

A negative pressure will be maintained in the kiln and in the afterburner in order to prevent gas leakage outside the system. An exhaust fan is used for creating the required negative pressure.

In the preferred embodiment and its operation, the ratio of air to oxygen or oxygen enriched air, the fuel feed rate and the oxygen excess level are selected for a particular composition and a particular feed rate of waste so that the required temperature, retention time, partial pressure of oxygen and turbulence in the afterburner and in the kiln are provided and the required destruction efficiency of POHCs is insured to comply with environmental standards.

The desired settings for temperature in the kiln and the afterburner, the maximum flow rates of combustion products from the kiln and the afterburner, and the safe level of negative pressure in the kiln and the afterburner vessel will be entered by the operator into the controller means 34.

Control means 34 will maintain the temperature of combustion product exhausted from the kiln according to a set point chosen by the operator. When temperature measured by thermocouple 20 drops below the desired set point, control means 34 will increase the amount of auxiliary fuel being delivered to the burner by raising the instant for setting for the auxiliary fuel supply line and accordingly on oxygen supply line so that the chosen oxygen excess level is provided until the temperature measured by thermocouple 20 has reached the desired set points chosen by the operator. Similar temperature control is provided for burner 10 of containment means 2.

At the same time, the control means 34 continuously compares the pressure measured by pressure transducer 22, with the pressure set point chosen by the operator as required to maintain a safe negative pressure condition within the kiln, insuring that any looseness in the kiln will result in a leakage of ambient air into the kiln rather than a leakage of combustion products from the kiln. Anytime the negative pressure measured by the pressure transducer 22 exceeds the safe set point chosen by the operator, the control means 34 will reduce the air flow set point and raise the oxygen flow set point in such fashion that each 4.76 volumes of air will be substituted by approximately 1 volume of oxygen fed in kiln 1 maintaining the total amount of the oxygen feed approximately constant until the negative pressure reaches the safe set point. Similar pressure regulation involving pressure transducer 24 is utilized in the afterburner.

To insure a maintenance of the desired retention time and to avoid additional air pollution volumes being produced in the kiln, the control means 34 continuously compares the allowed combustion product flow setting for the kiln discharge with the actual flow being measured by the flow transducer 23. When the actual flow exceeds the allowed set point chosen by the operator, the control means 34 reduces the air flow and increases the oxygen flow supplied to burner 1 in such a manner that the reduction in every 4.76 volumes of air flow will result in approximately a 1 volume increase in oxygen flow maintaining the total amount of the oxygen feed approximately constant until the combustion product flow reaches the allowed flow rate.

The control system 34, by means of thermocouples 20 and 21, will recognize an excessive increase in combustion product temperatures which result from the adjustments in pressures and flows and will reduce auxiliary fuel flow to bring the temperatures down to the desired levels. Simultaneously with the reduction of the auxiliary fuel flow, the oxygen flow will be reduced according to the approximately stoichiometric fuel/oxygen ratio.

Additionally, feed forward controls may be preferably used for both the primary incineration combustion means and containment means 2 when solid wastes are batch charged. Prior to the feeding of a batch charge, the feed indicating means 33 located upstream of the loading chute of feeding means 29 transmits a signal to the controlling means 34 identifying that a charge is approaching loading chute 29. In response, the control means 34 changes air, oxygen and auxiliary fuel set points to a special "emergency" set of values, insuring the supply of additional excess oxygen during such transient loading conditions, and activates modulating means 47–52 so that the feeding of air is reduced and the feeding of oxygen is increased in both the kiln and the afterburner prior to loading of the incineration system, resulting in a rapid rise in oxygen concentration in the kiln and afterburner as well as the temperature in the afterburner. The emergency set of values should provide for maximum prestored oxygen mass in the primary combustion incineration means and afterburner while maintaining the flame stability, as well as the required temperatures and retention time of gases during the transient event. The excess mass of oxygen accumulated in the kiln 1 in anticipation of the approaching batch charge is utilized to provide sufficient oxidizer during the first stage of waste charge volatilization. Optionally, the auxiliary fuel feed and/or the liquid waste feed delivered to primary incineration combustion means may also be reduced while maintaining the temperature in the kiln under venting conditions substantially above the temperature of ignition of organics in the waste to be charged, thus leaving more oxygen in the kiln volume available for incineration of a batch of wastes, and increasing the retention time for gaseous products in the kiln.

When the batch charge enters the kiln 1, there exists a substantial prestored oxygen mass in the primary incineration combustion means as well as the afterburner and the temperature conditions necessary for the combustion of organics in said batch in the primary incineration combustion means and afterburner. The levels of oxygen, air and fuel feed will be returned to those corresponding to the nominal feeding rates when the destruction of volatilized organics created during the transient overload condition is complete. The duration of such "emergency" cycle can be predicted by experience and the timer of control means 34 will maintain the initial duration setting of such "emergency" transient air, auxiliary fuel and oxygen flows based upon this prediction maintaining maximum partial pressure of oxygen and temperature in afterburner. During such an "emergency" cycle, thermocouples 20 and 21 may indicate temperature levels beyond steady state operating conditions. However, the control means 34 will overrule these signals during an "emergency" cycle so that overheating for a short time period is allowed After the "emergency" cycle ends, the control means 34 begins an "approaching cycle" which is designed to change gradually the auxiliary fuel flow and the oxygen flow towards a steady state ratio first in primary incineration combustion means and then in the afterburner. If during such cycle the smoke indicating means indicates smoke formation, the increase in the fuel flow will be discontinued but the oxygen flow will be raised again for a preset short time interval. After this time interval elapses, the "approaching cycle" will be initiated again. The control system will repeat the approaching cycle until the smoke is eliminated and the temperature and the level of excess oxygen in the kiln reach a normal level for steady operation. After such event the additional flow of oxygen being supplied to the afterburner to insure the complete combustion of any excess PICs during transient loading in the kiln will be discontinued and the afterburner will reach steady operational conditions. Proper temperature will be further maintained by thermocouples 20 and 21 and by control means 34.

Sensor means 20, 22, 23 and 35 located after the exit from kiln 1 and prior to containment means 2 will provide feedback control of the primary incineration combustion means and feed forward control of the afterburner means during the incineration process. These means supply electrical signals to control means 34 indicating the temperature, pressure or flow rate of gas leaving kiln 1 or the presence of excess smoke or flame. These signals are received and interpreted by control means 34, which in turn changes the oxygen, air and fuel flow into the kiln 1 and/or containment means 2.

Signals from thermocouples 20 and 21 are continuously compared with desired set points by the control means 34. A decrease or increase of the kiln 1 temperature beyond a desired set point triggers an increase or decrease, respectively, in the flow of auxiliary fuel by the use of the first fuel flow modulating means 52. The afterburner temperature is measured with thermocouple 21 and is compared by the control means 34 with a desired set point. A decrease or increase of the afterburner temperature beyond the desired set point triggers an increase or decrease, respectively, in the flow of auxiliary fuel by the use of the second fuel flow modulating means 49. An increase or decrease in the auxiliary fuel flow into the primary incineration combustion means 70 or the containment means 2 will be identified by control means 34 through communication with flow metering means 41 and 43. The control means 34 will also respond by adjusting the flow of oxygen to control the proper ratio between auxiliary fuel and oxidizer.

In order to prevent excess flue gas discharge from the incineration system, the control system will raise the flow of oxygen and reduce the flow of air based upon signals from the transducers 22, 23, 24, and 25 indicating that an excess amount of flue gases are being generated.

When the sensor means 35 detects excessive smoke or flame existing in the flue exhaust duct 5, indicating to the control means 34 a deficiency of oxygen in kiln 1, the control means 34 will activate first oxygen flow modulating means 48 to increase the oxygen supply and modulating means 52 and 36 to reduce auxiliary fuel flow and/or pumpable waste. When the second sensor means 65 detects excessive smoke or flame existing in the flue exhaust duct 32 indicating to the control means 34 a deficiency of oxygen in the containment means 2, the control means 34 will activate second oxygen flow modulating means 50 to increase the oxygen supply and modulating means 49 and 37 to reduce auxiliary fuel flow and/or pumpable waste.

Within the allowed magnitude of the batch charge and gradual fluctuations in the flow rate and composition of wastes, the process insures the required destruction efficiency of POHCs, prevents formation of PICs and minimizes formation of $NO_x$ due to the following features:

(a) The controlled oxygen to air ratio permits the change in the oxidizer flow in order to meet the oxygen demand and simultaneously to maintain the required temperature, retention time and turbulence. This eliminates such failure modes as overcharging or burning of wastes with low caloric value at temperatures below the required level. Additionally, the destruction and efficiency of POHCs, PICs and soot are increased, the negative effect of poor atomization of liquid wastes is minimized, and the possibility of a flame out failure is virtually eliminated;

(b) Uniform heating and intensive mixing due to the use of the burner means as described and due to rapid mixing of the hot oxidizing auxiliary combustion products with the flue gases, as presently described, eliminates cold spots and breakthrough of POHCs;

(c) The use of hot oxidizing and reducing auxiliary combustion products in combination with the hot oxidizing auxiliary combustion products in the afterburner further improves removal of $NO_x$ and destruction of POHCs, PICs and soot in the afterburner;

(d) The use of water or steam and ozone permits further optimization of either the oxidizing or reducing hot auxiliary combustion products which are used for $NO_x$ reduction and POHCs, PICs, sot and CO elimination;

(e) The use of rapid mix of the hot auxiliary combustion products with the flue gases in the afterburner provides uniform temperature and gaseous constituents distribution in the rapid mix chamber; and (f) Rapid control of oxygen, air and fuel feed into the primary combustion means and after burner provide fast response to changes in the waste feed and composition. The feed-forward control of batch combustion in both the primary and the secondary combustion means allows the maximization of the size of the batch charge for a given system, while feedback control of the primary and feed-forward control of the secondary combustion means allows the maximization of the magnitude of the gradual changes in the waste feed. In either case the temperature, retention time and turbulence are maintained at required levels A possible modification to the system is the conversion of a portion of the oxygen stream to ozone prior to its use as an exclusive oxidizer or in combination with air, oxygen or oxygen enriched air. Ozone can be most beneficially used as an oxidizer in situations where the need for additional heat input into the afterburner is insignificant. Ozone initiates chain reactions in the flame, thus resulting in faster and more complete destruction of POHC and reduction in the PIC formation.

A further modification is the use of water in line 90 as an additional oxidizing-reducing agent by its introduction into the combustion process in the primary incineration combustion means and afterburner. Water will disassociate at high temperatures into hydrogen, oxygen and hydroxide, which are beneficial to the combustion process. These species prevent formation of soot and cyclic and aromatic hydrocarbons including halogenated and oxygenated compounds which are frequently PICs. The use of water is most advantageous when the caloric value of the wastes being incinerated in the primary incineration combustion means is high and/or the ratio of H:C is low. The hydrogen formed from water reacts with halogens which are often found in the POHCs forming HCl, HF, etc., thus making halogens mobilized and not available for the formation of halogenated PICs.

A further modification of the vortex mixing chamber is the use of co-current or counter-current feed of flue gases from the primary incineration chamber and the hot auxiliary combustion product generated in the afterburner burner.

In cases where further improvements of the destruction level of hazardous waste is needed, a second afterburner means may be utilized with an embodiment similar to those described above to provide an additional step of afterburning the hot gaseous products leaving the first afterburner means. A partial recycling of the gaseous products between the primary incineration combustion means and the afterburner, or between a first and second afterburner, may be utilized for further reduction of PICs and POHCs. Partial recycling of flue gases provides mixing of high and low concentrated portions of flue gases and equalization of fluctuations of POHC an PIC in the gaseous effluent from the system. Optionally, a reducing atmosphere may be maintained in the first afterburner and/or in recycled gases thus providing $NO_x$ reduction in the flue gases entering the final afterburner. An oxidizing atmosphere may be provided in the second afterburner.

Alternative probes, such as thermal pyrometers, combustible gas analyzers, oxygen analyzers and UV scanners, may be used to indicate to the control system the existence of prefailure conditions.

While the above description contains many specificities, these should not be construed as limitations on the scope of the invention, but rather as an amplification of one preferred embodiment thereof.

What is claimed is:

1. A method of thermal destruction of waste material which comprises the steps of:
   (a) introducing solid waste material into a primary incineration combustion means;
   (b) providing a controllable amount of primary oxidizing gas into said primary incineration combustion means;
   (c) incinerating said solid waste in said primary incineration combustion means to produce solid residue and gaseous exhaust;
   (d) directing said gaseous exhaust from said primary incineration combustion means to containment means having an auxiliary burner generating hot auxiliary combustion product;
   (e) controllably introducing fluid combustible material into said auxiliary burner;
   (f) providing two secondary oxidizing gases having different oxygen and nitrogen concentrations from each other to said containment means, at least one of said oxidizing gases being provided into said auxiliary burner;
   (g) combusting the residual combustible components of said gaseous exhaust in said containment means and said fluid combustible material in said auxiliary burner;
   (h) sensing process characteristics in said primary incineration means and said containment means and generating signals indicative of the value of the process characteristics sensed;
   (i) comparing said sensed process characteristic signals with predetermined values for said process characteristics which insure reduction of hazardous components in said gaseous exhaust below a desired level and communicating the results of said comparison to means for controlling the flow of at least one of said two secondary oxidizing gases provided to said containment means;
   (j) sensing when batch of said waste material is about to be introduced into said primary incineration combustion means and generating a signal indicative of said introduction and communicating said introductions signal to said means for controlling the flow at least one of said two secondary oxidizing gases provided to said containment means; and
   (k) adjusting the flows of at least one of said oxidizing gases provided to said containment means to increase in response to said introduction signal the total amount of oxygen momentarily provided to said containment means and to increase the proportion of oxygen to nitrogen provided with said oxidizing gases.

2. The method of claim 1 wherein said secondary oxidizing gases are provided into said auxiliary burner.

3. The method of claim 2 wherein said secondary oxidizing gases are oxygen and air.

4. The method of claim 1 wherein said primary oxidizing gas is comprised of two gaseous oxidizers having different oxygen and nitrogen concentration.

5. The method of claim 4 wherein at least one of said gaseous oxidizers is provided into primary auxiliary burner firing into said primary incineration combustion means and burning primary fluid combustible material.

6. The method of claim 5, wherein the flow of said first fluid combustible material is reduced during said step of adjusting the flows.

7. The method of claim 6, which further comprises the step of directing a stream of water inside said primary incineration combustion means to reduce temperature.

8. The method of claim 4 wherein said indication signal is communicated to means controlling the flow of at least one of said two gaseous oxidizers and which further comprises the step of adjusting the flows of this one gaseous oxidizers to increase the amount of oxygen momentarily provided to said primary incineration combustion means and increasing the proportion of oxygen to nitrogen provided with said gaseous oxidizers.

9. The method of claim 1 wherein a signal indicative to said introduction of waste into said primary incineration combustible means is communicated to means for controlling the flows of said primary oxidizing gas and which further comprises the step of adjusting the flows of said primary oxidizing gas to increase the amount of oxygen momentarily provided to said primary incineration combustion means.

10. The method of claim 9 wherein the flow of at least one of said two secondary oxidizing gases during said step of adjusting the flows is provided for predetermined period of time.

11. The method of claim 1 wherein the flow of at least one of said two secondary oxidizing gases during said step of adjusting the flows is provided for predetermined period of time.

12. The method of claim 1, which further comprises the step of directing a stream of water inside said primary incineration combustion means to reduce temperature.

13. A method of thermal destruction of waste material which comprise the steps of:
   (a) introducing solid waste material into a primary incineration combustion means having a primary auxiliary burner;

(b) providing two primary oxidizing gases having a different oxygen and nitrogen concentrations from each other to said primary incineration combustion means at least one of said oxidizing gases being provided into said primary auxiliary burner;

(c) controllably introducing a first fluid combustible material into said primary auxiliary burner;

(d) incinerating said solid waste in said primary incineration combustion means to produce solid residue and gaseous exhaust;

(e) directing said gaseous exhaust from said primary incineration combustible means to containment means having a secondary auxiliary burner generating hot auxiliary combustion product;

(f) controllably introducing a second fluid combustible material into said secondary axiliary burner;

(g) providing a controllable amount of secondary oxidizing gas to said containment means;

(h) combusting the residual combustible components of said gaseous exhaust in said containment means and said fluid combustible material in said primary and secondary auxiliary burners;

(i) sensing process characteristics of said primary incineration means and said containment means and generating signals indicative of the value of the process characteristics sensed;

(j) comparing said sensed process characteristics signals with predetermined values for said process characteristics which insure reduction of hazardous components of said solid waste stream below a desired level and communicating the results of said comparisons to means for controlling the flows of at least one of said two primary oxidizing gases provided to said primary incineration combustion means;

(k) sensing when said batch of waste material is about to be introduced into said primary incineration combustion means and generating a signal indicative of said introduction and communicating said introduction signal to said means for controlling the flow of at least one of said two primary oxidizing gases; and (l) adjusting the flow of at least one of said two primary oxidizing gases to increase in response to said introduction signal the amount of oxygen momentarily provided to said primary incineration combustion means and to increase the proportion of oxygen to nitrogen provided with said primary oxidizing gases.

14. The method of claim 13 wherein said secondary oxidizing gas is comprised of two gaseous oxidizers having different oxygen and nitrogen concentration.

15. The method of claim 14 wherein one of said gaseous oxidizers is provided into said secondary auxiliary burner.

16. The method of claim 14, wherein a signal indicative to said introduction of waste into said primary incineration combustion means is communicated to means controlling the flow of at least one of said two gaseous oxidizers and which further comprises the step of adjusting the flow of this gaseous oxidizer provided to said containment means to increase the amount of oxygen momentarily provided to said containment means.

17. The method of claim 14, which further comprises the step of directing a stream of water inside said primary incineration combustible means to reduce temperature.

18. The method of claim 13 wherein at least one of said fluid combustible material is comprised of a liquid waste stream.

19. The method of claim 13 wherein said primary oxidizing gases are provided into said primary auxiliary burner.

20. The method of claim 13 wherein said two primary oxidizing gases are oxygen and air.

21. The method of claim 13 where in a signal indicative of said introduction of waste into said primary incineration combustion means is communicated to means for controlling the flows of said secondary oxidizing gas and which further comprises the step of adjusting the flows of said secondary oxidizing gas to increase the amount of oxygen momentarily provided to said containment means.

22. The method of claim 21 wherein the flows of said oxidizing gases provided during said step of adjusting of the flows are provided for predetermined period of time.

23. The method of claim 21, wherein the flow of said first fluid combustible material is reduced during said step of adjusting the flows.

24. The method of claim 13 wherein the flows of said oxidizing gases provided during said step of adjusting of the flows are provided for predeterminated period of time.

25. The method of claim 24, wherein the flow of said first fluid combustible material is reduced during said step of adjusting the flows.

26. The method of claim 24, further comprises a step of directing a stream of water inside interior of said primary incineration combustion means to reduce the temperature.

27. The method of claim 13, wherein the flow of said first fluid combustible material is reduced during said step of adjusting the flows.

28. The method of claim 13, wherein the flow of said first fluid combustible material is reduced during said step of adjusting the flows.

29. The method of claim 28, further comprises a step of directing a stream of water inside interior of said primary incineration combustion means to reduce the temperature.

30. The method of claim 13, which further comprises a step of directing a stream of water inside interior of said primary incineration combustion means to reduce the temperature.

31. A method of thermal destruction of waste material which comprises the steps of:

(a) introducing solid waste material into a primary incineration combustion means;

(b) providing a controllable amount of a primary oxidizing gas to said primary incineration combustion means;

(c) incinerating said solid waste in said primary incineration combustion means to produce solid residue and gaseous exhaust;

(d) directing said gaseous exhaust from said primary incineration combustion means to containment means having an auxiliary burner generating hot auxiliary combustion product;

(e) controllably introducing fluid combustible material into said auxiliary burner;

(f) providing two secondary oxidizing gases having different oxygen and nitrogen concentrations from each other to said containment means, at least one of said oxidizing gases being provided into said auxiliary burner;

(g) combusting the residual combustible components of said gaseous exhaust in said containment means and said fluid combustible material in said auxiliary burner;

(h) sensing process characteristics of said primary incineration means and said containment means and generating signals indicative of the value of the process characteristics sensed;

(i) comparing said sensing process characteristics signals with predetermined values for said process characteristics which insure reduction of hazardous components in said gaseous exhaust below a desired level and communicating the results of said comparison to means for controlling the flow at least one of said two secondary oxidizing gases provided to said containment means; and (j) sensing a value correlating with the level of unburned hazardous components in said gaseous exhaust;

(k) comparing said sensed correlating value with a predetermined value representing the safe level of said unburned hazardous components which insures their presence in exhaust gases exiting from thermal destruction process in concentration below environmentally desired level to detect the event when the level of unburned components exceeds said safe level;

(l) generating a signal indicative of said event and communicating this signal event to said means for controlling the flow of at least one of said two secondary oxidizing gases provided to said containment means; and (m) adjusting the flows of at least one of said secondary oxidizing gases provided to said containment means to increase in response to said signal the amount of oxygen momentarily provided to said containment means and to increase the proportion of oxygen to nitrogen provided with said oxidizing gases.

32. The method of claim 31 wherein said step of adjusting the flows further comprises the step of adjusting both flows of said secondary oxidizing gases to decrease the amount of nitrogen momentarily provided to said containment means.

33. The method of claim 32 wherein said primary oxidizing gas is comprised of two gaseous oxidizers having different oxygen and nitrogen concentrations.

34. The method of claim 32, which further comprises a step of directing a stream of water inside interior of said primary incineration combustion means to reduce the temperature.

35. The method of claim 31 wherein said primary oxidizing gas is comprised of two gaseous oxidizers having different oxygen and nitrogen concentrations.

36. The method of claim 35 or 33, wherein a signal indicative of said event is communicated to means controlling the flows of said two gaseous oxidizers and which further comprises the step of adjusting the flows of said gaseous oxidizers provided to said primary incineration combustion means to increase the amount of oxygen momentarily provided to said primary incineration combustion means and increasing the proportion of oxygen to nitrogen provided with said oxidizing gases.

37. The method of claim 36, wherein the flow of said first fluid combustible material is reduced during said step of adjusting the flows.

38. The method of claim 35, wherein at least one of said gaseous oxidizers is provided into a primary auxiliary burner firing into said primary incineration combustion means and burning primary fluid combustible material.

39. The method of claim 38, which further comprises a step of directing a stream of water inside interior of said primary incineration combustion means to reduce the temperature.

40. The method of claim 38, wherein the flow of said first fluid combustible material is reduced during said step of adjusting the flows.

41. The method of claim 40, which further comprises a step of directing a stream of water inside interior of said primary incineration combustible means to reduce the temperature.

42. The method of claim 35, wherein a signal indicative to said event is communicated to means controlling the flows of said primary oxidizing gas and which further comprises the step of adjusting the flows of said primary oxidizing gas to increase the amount of oxygen momentarily provided to said primary incineration combustion means.

43. The method of claim 35, wherein one of said gaseous oxidizers is provided into said secondary auxiliary burner.

44. The method of claim 31 wherein at least one of said fluid combustible material is comprised of a liquid waste stream.

45. The method of claim 31 wherein said two secondary oxidizing gases are provided into said auxiliary burner.

46. The method of claim 31 wherein said two secondary oxidizing gases are oxygen and air.

47. The method of claim 31 wherein said value correlating with the level of said unburned hazardous components is a concentration of carbon monoxide.

48. The method of claim 31 wherein said value correlating with the level of said unburned hazardous components is a concentration of oxygen.

49. The method of claim 31 wherein said value correlating with the level of said unburned hazardous components is an opacity of exhaust gases.

50. The method of claim 31, wherein a signal indicative to said event is communicated to means controlling the flows of said primary oxidizing gas and which further comprises the step of adjusting the flows of said primary oxidizing gas to increase the amount of oxygen momentarily provided to said primary incineration combustion means.

51. A method of thermal destruction of waste material which comprises the steps of:

(a) introducing solid waste material into a primary incineration combustion means having a primary auxiliary burner;

(b) providing two primary oxidizing gases having different oxygen and nitrogen concentration from each other to said primary incineration combustion means at least one of said oxidizing gases being provided into said primary auxiliary burner;

(c) controllably introducing a first fluid combustible material into said primary auxiliary burner;

(d) incinerating said solid waste in said primary incinerating combustion means to produce solid residue and gaseous exhaust;

(e) directing said gaseous exhaust from said primary incineration combustion means to containment means having a secondary auxiliary burner generating hot auxiliary combustion product;

(f) controllably introducing a secondary fluid combustible material into said secondary auxiliary burner;

(g) providing a controllable amount of secondary oxidizing gas to said containment means;

(h) combusting the residual combustible components of said gaseous exhaust in said containment means and said fluid combustible materials in said primary and secondary auxiliary burners;

(i) sensing process characteristics of said primary incinerating means and said containment means and generating signals indicative of the value of the process characteristics sensed;

(j) comparing said sensed process characteristic signals with predetermined values for said process characteristics which insure reduction of hazardous components in said solid waste stream below a desired level and communicating the results of said comparisons to means for controlling the flow of at least one of said two primary oxidizing gases provided to said primary incineration combustion means;

(k) sensing a value correlating with the level of unburned hazardous components in said gaseous exhaust;

(1) comparing said sensed correlating value with a predetermined value representing the safe level of said unburned components which insures their presence in exhaust gases exiting from thermal destruction process in concentrations below desired level to detect the event when the level of unburned components exceed said safe level;

(m) generating a signal indicative of this event and communicating this signal to said means for controlling the flows of said primary oxidizing gases provided to said primary incineration combustion means; and (n) adjusting the flows of said primary oxidizing gases in response to said signal to increase the amount of oxygen momentarily provided to said primary incinerating combustion means and increasing the proportion of oxygen to nitrogen provided with said primary oxidizing gases.

52. The method of claim 51, wherein said value correlating with the level of said unburned hazardous components is a concentration of carbon monoxide.

53. The method of claim 51, wherein said value correlating with the level of said unburned hazardous components is a concentration of oxygen.

54. The method of claim 51, wherein said value correlating with the level of said unburned hazardous components is an opacity of exhaust gases.

55. The method of claim 51, wherein at least one of said fluid combustible material comprises a liquid waste stream.

56. The method of claim 51, wherein said two primary oxidizing gases are provided into said primary auxiliary burner.

57. The method of claim 51, wherein said two primary oxidizing gases are oxygen and air.

58. The method of claim 57, which further comprises a step of directing a stream of water inside interior of said primary incineration combustion means to reduce the temperature.

59. The method of claim 51, wherein a signal indicative of said event is communicated to means for controlling the flows of said secondary oxidizing gas and which further comprises the step of adjusting the flows of said secondary oxidizing gas to increase the amount of oxygen momentarily provided to said containment means.

60. The method of claim 51, wherein said secondary oxidizing gas is comprised of two gaseous oxidizers having different oxygen and nitrogen concentrations.

61. The method of claim 60, wherein a signal indicative to said event is communicated to means controlling the flows of said two gaseous oxidizers and which further comprises the step of adjusting the flows of said gaseous oxidizers provided to said containment means to increase the amount of oxygen momentarily provided to said containment means and increasing the proportion of oxygen to nitrogen provided with said oxidizing gases.

62. The method of claim 51 wherein said step of adjusting the flows further comprises the step of decreasing the amount of nitrogen momentarily provided to said primary incineration combustion means.

63. The method of claim 62, wherein said secondary oxidizing gas is comprised of two gaseous oxidizers having different oxygen and nitrogen concentrations.

64. The method of claim 62, wherein a signal indicative of said event is communicated to means for controlling the flows of said secondary oxidizing gas and which further comprises the step of adjusting the glows of said secondary oxidizing gas to increase the amount of oxygen momentarily provided to said containment means.

65. The method of thermal destruction of waste material which comprises the steps of:

(a) introducing solid waste material into a primary incineration combustion means;

(b) providing a controllable amount of a primary oxidizing gas to said primary incineration combustion means;

(c) incinerating said solid waste in said primary incineration combustion means to produce solid residue and gaseous exhaust;

(d) directing said gaseous exhaust from said primary incineration combustion means to containment means having an auxiliary burner generating hot auxiliary combustion product;

(e) controllably introducing fluid combustible material into said auxiliary burner;

(f) providing two secondary oxidizing gases having different oxygen and nitrogen concentrations from each other to said containment means, at least one of said oxidizing gases being provided into said auxiliary burner;

(g) combusting the residual combustible components of said gaseous exhaust in said containment means and said fluid combustible material in said auxiliary burner;

(h) sensing process characteristics of said primary incineration means and said containment means and generating signals indicative of the value of the process characteristics sensed;

(i) comparing said sensed process characteristic signals with predetermined values for said process characteristics which insure reduction of hazardous components in said gaseous exhaust below a desired level and communicating the results of said comparisons to means for controlling the flows of said secondary oxidizing gases provided to said containment means;

(j) sensing a value correlating with the level of negative pressure within said primary incineration combustion means;

(k) comparing sensed correlating value with a predetermined value representing the level of negative pressure which insures an absence of any leakage from said primary combustion means to detect the event when said correlating value is reduced below said predetermined value;

(l) generating a signal indicative of this event and communicating this signal to said means for controlling the flows of oxidizing gases provided to said containment means; and (m) adjusting the flows of said oxidizing gases provided to said containment means to reduce in response to said signal the amount of nitrogen momentarily provided to said containment means and to increase the proportion of oxygen to nitrogen provided with said oxidizing gases.

66. The method of claim 65, wherein a signal indicative to said event is communicated to means controlling the flows of said primary oxidizing gas and which further comprises the step of adjusting the flows of said primary oxidizing gas in response to said signal to reduce the amount of nitrogen momentarily provided to said primary incineration combustion means.

67. The method of claim 65, wherein at least on of said fluid combustible material comprises a liquid waste stream.

68. The method of claim 65, wherein said two secondary oxidizing gases are provided into said auxiliary burner.

69. The method of claim 65, wherein said two secondary oxidizing gases are oxygen and air.

70. The method of claim 65, wherein said primary oxidizing gas is comprised of two gaseous oxidizers having a different oxygen and nitrogen concentrations.

71. The method of claim 70, wherein a signal indicative to said event is communicated to means controlling the flows of said two gaseous oxidizers and which further comprises the step of adjusting the flows of said gaseous oxidizers in response to said signal to reduce the amount of nitrogen momentarily provided to said primary incineration combustion means and to increase the proportion of oxygen to nitrogen provided with said gaseous oxidizers.

72. The method of claim 71, wherein the flow of said first fluid combustible material is reduced during said step of adjusting the flows.

73. The method of claim 71, wherein said two primary oxidizing gases are oxygen and air.

74. The method of claim 70, wherein at least one of said gaseous oxidizers is provided into a primary auxiliary burner firing into said primary incineration combustion means and burning primary fluid combustible material.

75. The method of claim 74, wherein said two gaseous oxidizers are oxygen and air.

76. The method of claim 74, wherein the flow of said first fluid combustible material is reduced during said step of adjusting the flows.

77. The method of claim 76, wherein said two primary oxidizing gases are oxygen and air.

78. The method of claim 74, wherein said two primary oxidizing gases are oxygen and air.

79. The method of claim 70, wherein said two gaseous oxidizers are oxygen and air.

80. A method of thermal destruction of waste material which comprises the steps of:

(a) introducing solid waste material into a primary incineration combustion means having a primary auxiliary burner;

(b) providing two primary oxidizing gases having different oxygen and nitrogen concentration from each other to said primary incineration combustion means, at least one of said oxidizing gases being provided into said primary auxiliary burner;

(c) controllably introducing first fluid combustible material into said primary auxiliary burner;

(d) incinerating said solid waste in said primary incineration combustion means to produce solid residue and gaseous exhaust;

(e) directing said gaseous exhaust from said primary incineration combustion means to containment means having a secondary auxiliary burner generating hot auxiliary combustion product;

(f) controllably introducing a second fluid combustible material to said secondary auxiliary burner;

(g) providing a controllable amount of secondary oxidizing gas to said containment means;

(h) combusting the residual combustible components of said gaseous exhaust in said containment means and said fluid combustible materials in said primary and secondary auxiliary burners;

(i) sensing process characteristics of said primary incineration means and said containment means and generating signals indicative of the value of the process characteristics sensed;

(j) comparing said sensed process characteristic signals with predetermined values for said process characteristics which insure reduction of hazardous components in said solid waste stream below a desired level and communicating the results of said comparisons to means for controlling the flow of said two primary oxidizing gases;

(k) sensing the value correlating with the level of negative pressure within said primary incineration combustion means;

(l) comparing sensed correlating value with a predetermined value representing the level of negative pressure which insures an absence of any leakage from said primary combustion means to detect the event when said correlating value is reduced below said predetermined value;

(m) generating a signal indicative of this event and communicating this signal to said means for controlling the flows of said two primary oxidizing gases; and (n) adjusting the flows of said primary oxidizing gases in response to said signal to reduce the amount of nitrogen momentarily provided to said primary incineration combustion means and to increase the proportion of oxygen to nitrogen provided with said primary oxidizing gases.

81. The method of claim 80, wherein said secondary oxidizing gas is comprised of two gaseous oxidizers having different oxygen and nitrogen concentrations.

82. The method of claim 81, wherein of said gaseous oxidizers is provided into said secondary auxiliary burner.

83. The method of claim 81, wherein a signal indicative to said event is communicated to means controlling the flows of said two gaseous oxidizers and which further comprises the step of adjusting the flows of said gaseous oxidizers provided to said containment means to reduce the amount of nitrogen momentarily provided to said containment means and to increase the proportion of oxygen to nitrogen provided with said gaseous oxidizers.

84. The method of claim 80, wherein a signal indicative to said event is communicated to a means controlling the flows of said secondary oxidizing gas and which further comprises the step of adjusting the flows of said secondary oxidizing gas to reduce the amount of nitrogen momentarily provided to said containment means.

85. The method of claim 80, wherein said value correlating with the level of negative pressure is the value of pressure at exit of said primary incineration combustion means.

86. The method of claim 80, wherein said value correlating with the level of the negative pressure is the value of pressure at the exist of said containment means.

87. The method of claim 80, wherein at least one of said fluid combustible material comprises a stream of liquid waste.

88. The method of claim 80, wherein said primary oxidizing gases are provided into said primary auxiliary burner.

89. The method of claim 80, wherein said two primary oxidizing gases are oxygen and air.

90. The method of claim 80, wherein said two gaseous oxidizers are oxygen and air.

* * * * *